US008548273B2

(12) United States Patent
Tsukagoshi

(10) Patent No.: US 8,548,273 B2
(45) Date of Patent: Oct. 1, 2013

(54) IMAGE DISPLAY APPARATUS AND IMAGE DISPLAY METHOD

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 580 days.

(21) Appl. No.: 12/843,204

(22) Filed: Jul. 26, 2010

(65) Prior Publication Data

US 2011/0096102 A1 Apr. 28, 2011

(30) Foreign Application Priority Data

Oct. 22, 2009 (JP) ................................ 2009-243426

(51) Int. Cl.
*G06K 9/00* (2006.01)

(52) U.S. Cl.
USPC ............................. 382/298; 382/266; 382/300

(58) Field of Classification Search
USPC .................................. 382/260–266, 298–300
See application file for complete search history.

(56) References Cited

U.S. PATENT DOCUMENTS 6,760,489 B1 * 7/2004 Kuwata ......................... 382/300
6,985,641 B1   1/2006 Michel et al.

FOREIGN PATENT DOCUMENTS

JP    A-8-336046      12/1996
JP    A-2000-339450   12/2000

* cited by examiner

*Primary Examiner* — Wesley Tucker
(74) *Attorney, Agent, or Firm* — Oliff & Berridge, PLC

(57) ABSTRACT

An image display apparatus which displays an image includes: an image input unit which accepts an input of an image used for display; an image processing unit which carries out image processing including sharpness processing to uniformly sharpen an entire image area and super-resolution processing to selectively sharpen an image enlarged by interpolation of pixels, on the image accepted by the image input unit; an image display unit which displays the image processed by the image processing unit; and a sharpness setting unit which reduces the intensity of the sharpness processing in accordance with an increase in the intensity of the super-resolution processing and increases the intensity of the sharpness processing in accordance with a reduction in the intensity of the super-resolution processing.

10 Claims, 7 Drawing Sheets

FIG. 8

| | | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| DESIGNATE VALIDITY OF SUPER-RESOLUTION | ACCEPTANCE LEVEL VALUE | 0 | 1 | 2 | 3 | 4 | 5 | 6 | 7 | 8 | 9 | 10 | 11 | 12 | 13 | 14 | 15 | 16 | 17 | 18 | 19 | 20 |
| | SHARPNESS SETTING INTENSITY Ds1 | 2 | 3 | 4 | 5 | 6 | 7 | 8 | 9 | 10 | 11 | 12 | 13 | 14 | 15 | 16 | 17 | 18 | 19 | 20 | 21 | 22 | 372 |
| DESIGNATE INVALIDITY OF SUPER-RESOLUTION | ACCEPTANCE LEVEL VALUE | 0 | 1 | 2 | 3 | 4 | 5 | 6 | 7 | 8 | 9 | 10 | 11 | 12 | 13 | 14 | 15 | 16 | 17 | 18 | 19 | 20 |
| | SHARPNESS SETTING INTENSITY Ds1 | 5 | 6 | 7 | 8 | 9 | 10 | 11 | 12 | 13 | 14 | 15 | 16 | 17 | 18 | 19 | 20 | 21 | 22 | 23 | 24 | 25 | 374 |

FIG. 9

| | | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| DESIGNATE VALIDITY OF SUPER-RESOLUTION | ACCEPTANCE LEVEL VALUE | 0 | 1 | 2 | 3 | 4 | 5 | 6 | 7 | 8 | 9 | 10 | 11 | 12 | 13 | 14 | 15 | 16 | 17 | 18 | 19 | 20 |
| | SHARPNESS SETTING INTENSITY Ds1 | 2 | 3 | 4 | 5 | 6 | 7 | 8 | 9 | 10 | 11 | 12 | 13 | 14 | 15 | 16 | 17 | 18 | 19 | 21 | 23 | 25 | 373 |
| DESIGNATE INVALIDITY OF SUPER-RESOLUTION | ACCEPTANCE LEVEL VALUE | 0 | 1 | 2 | 3 | 4 | 5 | 6 | 7 | 8 | 9 | 10 | 11 | 12 | 13 | 14 | 15 | 16 | 17 | 18 | 19 | 20 |
| | SHARPNESS SETTING INTENSITY Ds1 | 5 | 6 | 7 | 8 | 9 | 10 | 11 | 12 | 13 | 14 | 15 | 16 | 17 | 18 | 19 | 20 | 21 | 22 | 23 | 24 | 25 | 374 |

IMAGE DISPLAY APPARATUS AND IMAGE DISPLAY METHOD

CROSS-REFERENCE

The present application claims priority from Japanese Patent Application No. 2009-243426 filed on. Oct. 22, 2009, which is hereby incorporated by reference in its entirety.

BACKGROUND

As an image display apparatus, for example, a liquid crystal display which displays an image by adjusting transmitted light using a liquid crystal composite or a plasma display which displays an image utilizing light emission generated by an electrical discharge is known as well as a projector which displays an image by projection. Such an image display apparatus carries out various kinds of image processing on an input image that is inputted from outside, and displays the image-processed image as an output image. The input image inputted to the image display apparatus from outside may be, for example, an input image based on a reproduced signal from a recording medium such as a DVD (digital versatile disk), an input image based on a broadcast signal from a broadcasting station, an input image based on a communication signal in data communication or the like.

The image processing carried out in the image display apparatus includes, for example, image enlargement processing (up-scaling and up-conversion), sharpness processing (sharpening) and the like are known. The image enlargement processing is to interpolate pixels and thus enlarge an image in order to display the image in an enlarged form. The sharpness processing is to uniformly enhance high-frequency components of the spatial frequency in an entire image area in order to sharpen a blurred and unsharp image.

Recently, in order to improve further the image quality of an image displayed by the image display apparatus, it is proposed that image processing (so-called "super-resolution processing") to detect and selectively sharpen a contour part that is blurred before or after the enlargement of an image enlarged by interpolation of pixels should be applied to the image display apparatus. Japanese Patent Publication No. 2000-339450 and No. 8-336046 disclose examples of super-resolution processing.

However, traditionally, in carrying out in the image display apparatus the sharpness processing and the super-resolution processing, which are similar in terms of sharpening an image, proper combination of these two kinds of image processing is not thoroughly examined.

SUMMARY

An advantage of some aspects of the embodiments is to provide a technique capable of improving the quality of an image displayed in an enlarged form by interpolation of pixels.

Another advantage of some aspects of the embodiments is to solve at least a part of the problems mentioned above and the invention can be implemented in the following embodiments or application examples.

According to at least one embodiment of the disclosure, an image display apparatus includes: an image input unit which accepts an input of an image used for display; an image processing unit which carries out image processing including sharpness processing to uniformly sharpen an entire image area and super-resolution processing to selectively sharpen an image enlarged by interpolation of pixels, on the image accepted by the image input unit; an image display unit which displays the image processed by the image processing unit; and a sharpness setting unit which reduces the intensity of the sharpness processing in accordance with an increase in the intensity of the super-resolution processing and increases the intensity of the sharpness processing in accordance with a reduction in the intensity of the super-resolution processing. With this image display apparatus, excessive sharpening of an image due to the implementation of the two kinds of image processing that are similar in terms of sharpening an image, that is, sharpness processing and super-resolution processing, can be avoided. Consequently, the quality of an image displayed in an enlarged form by interpolation of pixels can be improved.

According to at least one embodiments of the disclosure, the image display apparatus may further include a super-resolution on-off accepting unit which accepts an instruction to select the intensity of the super-resolution processing including invalidity of the super-resolution processing, and a super-resolution setting unit which sets the intensity of the super-resolution processing carried out by the image processing unit to a valid value that is smaller than in the case where an instruction to select valid intensity is accepted by the super-resolution on-off accepting unit, if an instruction to select invalidity is accepted by the super-resolution on-off accepting unit. With this image display apparatus, the image quality due to the super-resolution processing can be improved while excessive sharpness due to the super-resolution processing can be avoided.

According to at least one embodiment of the disclosure, the image display apparatus may further include a sharpness intensity accepting unit which accepts an instruction to select one of plural level values representing the intensity of the sharpness processing. The sharpness setting unit reduces the intensity of the sharpness processing in accordance with an increase in the intensity of the super-resolution processing and increases the intensity of the sharpness processing in accordance with a reduction in the intensity of the super-resolution processing, within a variance range corresponding to the level value accepted by the sharpness intensity accepting unit. The variance range corresponding to the level value may become smaller as the level value becomes greater. With this image display apparatus, the sharpening effect can be enhanced according to a request for intenser sharpening while excessive sharpening due to the sharpness processing and the super-resolution processing can be avoided.

According to at least one embodiment of the disclosure, the image processing unit of the image display apparatus may carry out the sharpness processing prior to the super-resolution processing on the image accepted by the image input unit. With this image display apparatus, a part of a contour part that is blurred before or after enlargement of an image enlarged by interpolation of pixels is sharpened by the sharpness processing before the super-resolution processing is carried out. Therefore, the processing speed of the super-resolution processing can be improved.

According to at lest one embodiment of the disclosure an image display method includes: accepting an input of an image; carrying out image processing including sharpness processing to uniformly sharpen an entire image area and super-resolution processing to selectively sharpen an image enlarged by interpolation of pixels, on the accepted image; displaying the processed image by an image display apparatus which displays an image; and reducing the intensity of the sharpness processing in accordance with an increase in the intensity of the super-resolution processing and increasing the intensity of the sharpness processing in accordance with a reduction in the intensity of the super-resolution processing. With this image display method, excessive sharpening of an image due to the implementation of the two kinds of image processing that are similar in terms of sharpening an image, that is, sharpness processing and super-resolution processing, can be avoided. Consequently, the quality of an image displayed in an enlarged form by interpolation of pixels can be improved.

Embodiments of the invention are not limited to the image display apparatus and the image display method and may include other forms of embodiments such as a program which causes a computer to realize the function of displaying an image, an image processing apparatus and image processing method to process an image, and a program which causes a computer to realize the function of processing an image. The invention is not limited to the above application examples and can be carried out in various forms without departing from the scope of the invention.

BRIEF DESCRIPTION OF THE DRAWINGS

Non-limiting and non-exhaustive embodiments of the present disclosure will be described with reference to the accompanying drawings, wherein like reference numbers reference like elements.

FIG. 8 is an explanatory view showing an exemplary sharpness intensity table that is set by a sharpness setting unit in intensity adjustment processing.

FIG. 9 is an explanatory view showing an exemplary sharpness intensity table in a first modification.

DESCRIPTION OF EMBODIMENTS

In order to further clarify the configuration and effects of the invention described above, a projector as an image display apparatus to which the invention is applied will be described hereinafter.

A. Embodiment

A1. Configuration of Projector

Figure 1:
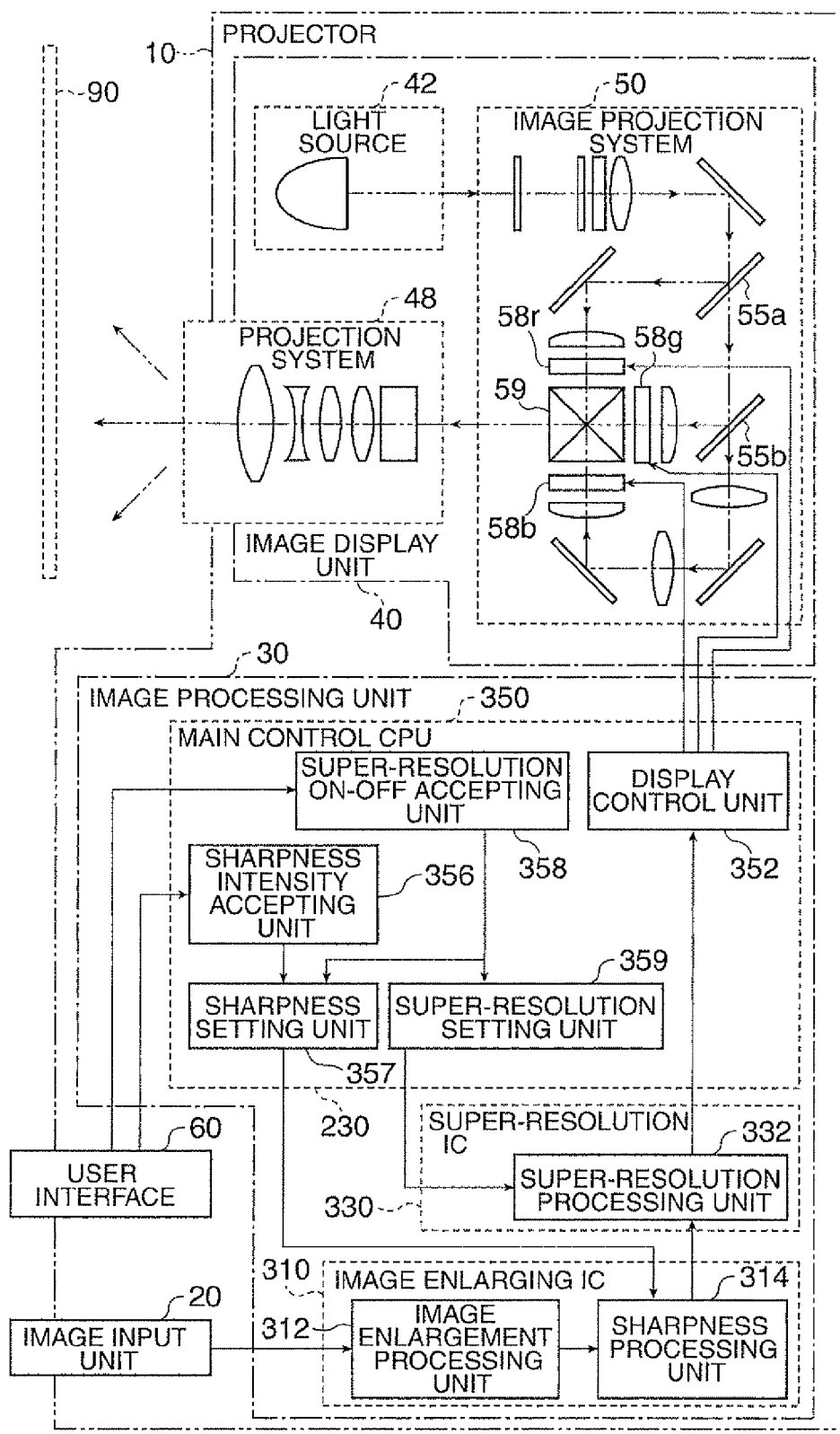
FIG. 1 is an explanatory view showing the configuration of a projector.

FIG. 1 is an explanatory view showing the configuration of a projector 10. The projector 10 projects a video on a screen 90 and thus displays an image. The screen 90 is a flat surface on which a video is displayed. The screen 90 may be a projection screen or a wall surface. The projector 10 has an image input unit 20, an image processing unit 30, an image display unit 40, and a user interface 60.

The image input unit 20 of the projector 10 accepts an input of an image used for display. In this example, the image input unit 20 can accept various input images including an input image based on a reproduced signal from a recording medium such as a DVD, an input image based on a broadcast signal from a broadcasting station, and an input image based on a communication signal in data communication.

The image processing unit 30 of the projector 10 carries out various kinds of image processing such as image enlargement processing (up-scaling and up-conversion), sharpness processing (sharpening), and super-resolution processing, on the input image accepted by the image input unit 20. In this example, the image processing unit 30 has an image enlarging integrated circuit (hereinafter called "image enlarging IC") 310, a super-resolution integrated circuit (hereinafter called "super-resolution IC") 330, and a main control central processing unit (hereinafter called "main control CPU") 350. In this example, the image processing unit 30 has a storage device (not shown) which temporarily stores processing data when carrying out various kinds of image processing, in addition to the image enlarging IC 310, the super-resolution IC 330 and the main control CPU 350.

The image enlarging IC 310 of the image processing unit 30 has an image enlargement processing unit 312 which carries out image enlargement processing to enlarge an image by interpolating pixels. In this example, the image enlargement processing unit 312 carries out image enlargement processing on the input image accepted by the image input unit 20. In this example, if the input image accepted by the image input unit 20 is an image having a relatively small number of pixels, for example, 720 (vertical) by 480 (horizontal) pixels, 640 (vertical) by 480 (horizontal) pixels, and the like, the image enlargement processing unit 312 enlarges the input image to 1920 (vertical) by 1080 (horizontal) pixels.

In this example, the image enlarging IC 310 has a sharpness processing unit 314 which carries out sharpness processing to uniformly sharpen the entire image area, in addition to the image enlargement processing unit 312. In this example, the sharpness processing unit 314 carries out sharpness processing on the image processed by the image enlargement processing unit 312.

Figure 2:
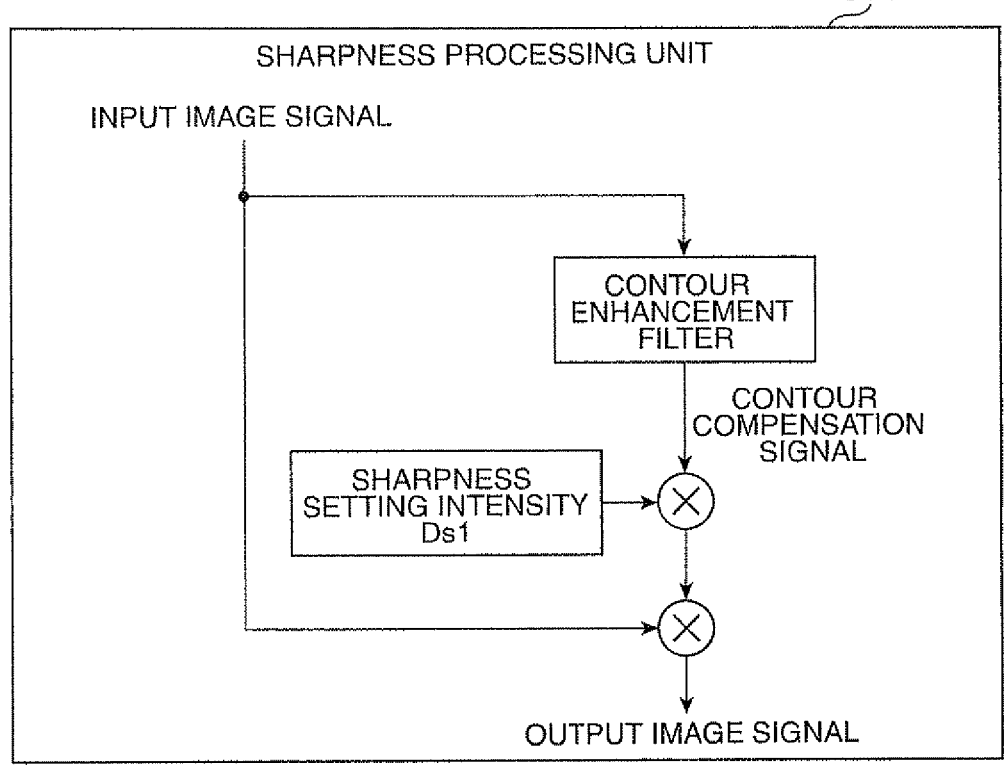
FIG. 2 is an explanatory view showing the outline of sharpness processing by a sharpness processing unit.

FIG. 2 is an explanatory view showing the outline of the sharpness processing by the sharpness processing unit 314. The sharpness processing unit 314 generates a contour compensation signal as a result of extracting a high-frequency component of the spatial frequency from the input image signal inputted to the sharpness processing unit 314 by using a contour enhancement filter, which is a kind of high-pass filter, and then amplifies the contour compensation signal by using a sharpness setting intensity Ds1 indicating the intensity of the sharpness processing. After that, the sharpness processing unit 314 adds the contour compensation signal amplified with the sharpness setting intensity Ds1 to the original input image signal and thus outputs an output image signal with its entire image area uniformly sharpened. In this example, the sharpness processing unit 314 can carry out the sharpness processing with a total of 26 levels of sharpness setting intensity Ds1 from the minimum value "0" to the maximum value "25". If the sharpness setting intensity Ds1 has the minimum value "0", the sharpness processing is invalid.

Back to the explanation of FIG. 1, the super-resolution IC 330 of the image processing unit 30 has a super-resolution processing unit 332 which carries out super-resolution processing to detect and selectively sharpen a contour part that is blurred before or after the enlargement of an image enlarged by interpolation of pixels. In this example, the super-resolution processing unit 332 carries out the super-resolution processing on the image processed by the image enlargement processing unit 312 and the sharpness processing unit 314 of the image enlarging IC 310.

Figure 3:
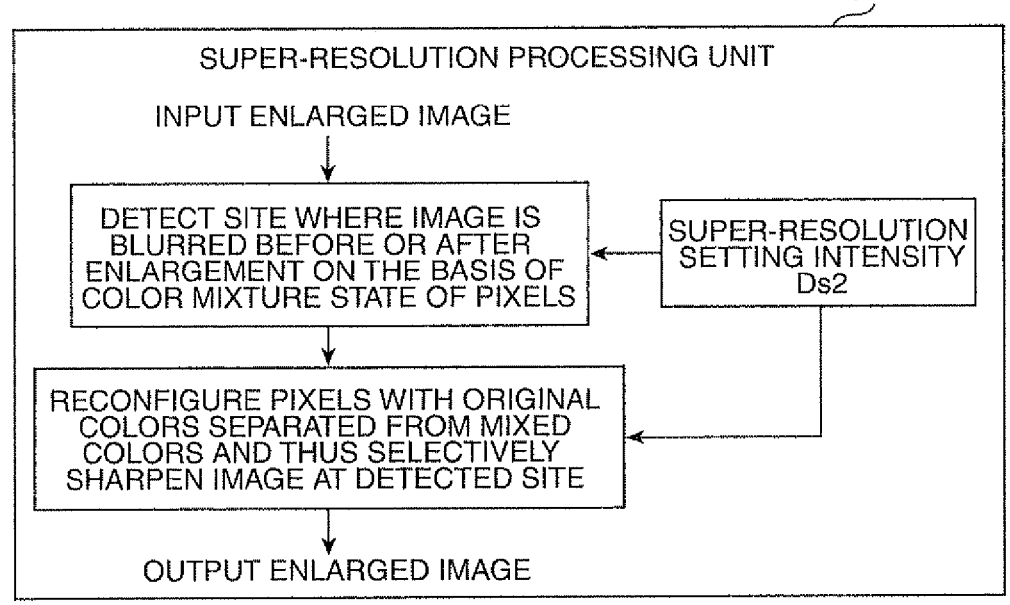
FIG. 3 is an explanatory view showing the outline of super-resolution processing by a super-resolution processing unit.

FIG. 3 is an explanatory view showing the outline of the super-resolution processing by the super-resolution processing unit 332. In this example, the super-resolution processing unit 332 detects a site where the image is blurred before or after enlargement on the basis of the color mixture state of pixels constituting the input enlarged image that is enlarged by the image enlarging IC 310. After that, the super-resolution processing unit 332 separates the mixed colors at the detected site into the original colors of the image before the enlargement, and reconfigures the image at the detected site with the separated colors. Thus, the super-resolution processing unit 332 outputs an output enlarged image that is selectively sharpened at the detected site. In this example, various threshold values by which to determine the color mixture state of pixels in the input enlarged image and various threshold values by which to determine the reconfiguration of pixels with the original colors separated from the mixed colors are amplified with a super-resolution setting intensity $Ds2$ indicating the intensity of the super-resolution processing. In this example, the super-resolution processing unit 332 can carry out the super-resolution processing with a total of 11 levels of super-resolution setting intensity $Ds2$ from the minimum value "0" to the maximum value "10". If the super-resolution setting intensity $Ds2$ has the minimum value the super-resolution processing is invalid.

Figure 4:
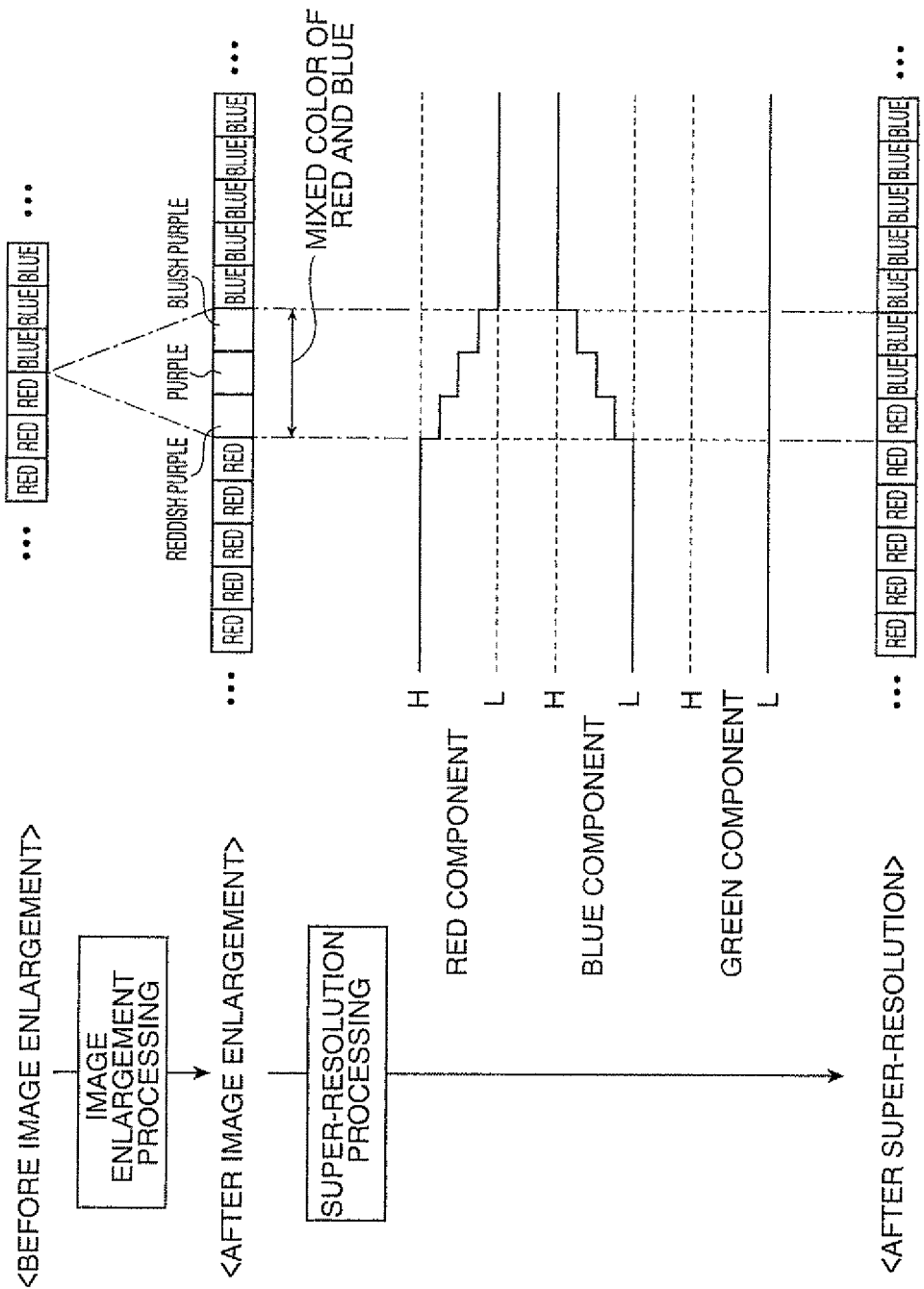
FIG. 4 is an explanatory view showing an example of super-resolution processing by the super-resolution processing unit.

FIG. 4 is an explanatory view showing an example of the super-resolution processing by the super-resolution processing unit 332. The top section of FIG. 4 shows pixels constituting a part of an image before the enlargement by the image enlarging IC 310. The middle section of FIG. 4 shows the pixels after the site shown in the top is enlarged by the image enlarging IC 310. The bottom section of FIG. 4 shows the pixels after the site shown in the middle is sharpened by the super-resolution processing unit 332.

At the site where plural consecutive red pixels are followed by plural consecutive blue pixels before the enlargement by the image enlarging IC 310 as shown in the top section of FIG. 4, plural pixels are newly interpolated in the boundary between the red pixels and the blue pixels after the enlargement by the image enlarging IC 310 as shown in the middle section of FIG. 4. These plural interpolated pixels are formed in red and blue color mixture in which the color gradually changes from red to blue. In the example shown in FIG. 4, the pixels at the site where pixels are interpolated between the red pixels and the blue pixels are arrayed in order of red, reddish purple, purple, bluish purple, and blue.

In the lower part of the middle section of FIG. 4, the color components of the pixels after the enlargement are separated into three components of red, blue, and green. In the example shown in FIG. 4, at the site where pixels are newly interpolated in the boundary between the red pixels and the blue pixels, pixels having a relatively large red component and a relatively small blue component continue, followed by a rapid decline in the red component and a rapid increase in the blue component. Then, pixels having a relatively large blue component and a relatively small red component continue. In this example, at the detected site that is detected by the super-resolution processing unit 332 as a site where the image is blurred before or after the enlargement, a predetermined number of pixels having a change in each color component within a predetermined threshold range continue, followed by a rapid decline in one of the two color components along with a rapid increase in the other color component, and then a predetermined number of pixels having a change in each color component within a predetermined threshold range continue with the ratio of the two color components reversed, as shown in the middle section of FIG. 4.

As shown in the bottom section of FIG. 4, at the detected site that is detected by the super-resolution processing unit 332 as a site where the image is blurred before or after the enlargement, the image is reconfigured by pixels in the original colors separated from the mixed colors. In the example shown in FIG. 4, of the pixels of the mixed colors at the detected site, the pixels on the side where red continues are reconfigured in red and the pixels on the side where blue continues are reconfigured in blue.

Back to the explanation of FIG. 1, the main control CPU 350 of the image processing unit 30 controls each part of the projector 10. The main control CPU 350 has a display control unit 352, a sharpness intensity accepting unit 356, a sharpness setting unit 357, a super-resolution on-off accepting unit 358, and a super-resolution setting unit 359, as functions realized by software-based operations. In an alternative embodiment, at least a part of the functions realized by the main control CPU 350 may be realized by the operation of the electronic circuit of the image processing unit 30 based on its physical circuit configuration.

The display control unit 352 of the main control CPU 350 converts the image signal on which various kinds of image processing is carried out by the image processing unit 30 to a signal that can be displayed by the image display unit 40, and then outputs the signal to the image display unit 40.

The sharpness intensity accepting unit 356 of the main control CPU 350 accepts an instruction to select plural acceptance level values indicating intensities of the sharpness processing carried out by the sharpness processing unit 314, from the user of the projector 10 via the user interface 60. The sharpness setting unit 357 of the main control CPU 350 sets the sharpness setting intensity $Ds1$ of the sharpness processing carried out by the sharpness processing unit 314, in accordance with the acceptance level value accepted by the sharpness intensity accepting unit 356. In this example, the sharpness setting unit 357 reduces the intensity of the sharpness processing carried out by the sharpness processing unit 314 in accordance with an increase in the intensity of the super-resolution processing carried out by the super-resolution processing unit 332 and increases the intensity of the sharpness processing carried out by the sharpness processing unit 314 in accordance with a reduction in the intensity of the super-resolution processing carried out by the super-resolution processing unit 332.

Figure 5:
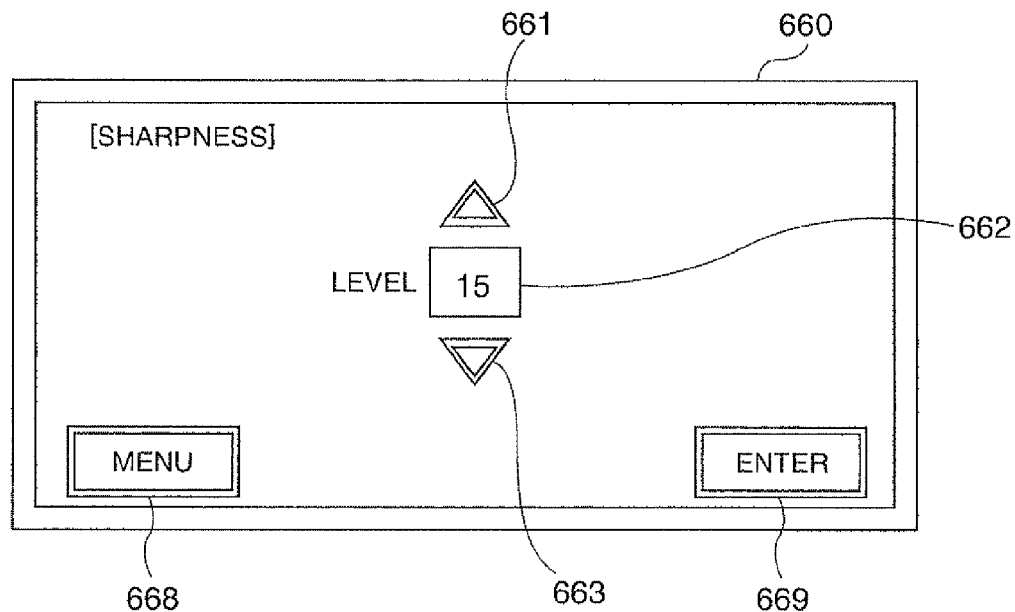
FIG. 5 is an explanatory view showing an acceptance screen to accept an instruction to select a level value of sharpness processing.

FIG. 5 is an explanatory view showing an acceptance screen 660 to accept an instruction to select a level value of the sharpness processing. In this example, the user interface 60 is a touch panel having both a display function and an input function. The acceptance screen 660 is a screen displayed on the user interface 60 at the time of accepting an instruction to select an acceptance level value of the sharpness processing. The acceptance screen 660 has an increase button 661, a level display section 662, a decrease button 663, a menu button 668, and an enter button 669.

The level display section 662 in the acceptance screen 660 shows the acceptance level value of the sharpness processing that is accepted from the user. In this example, the acceptance level value of the sharpness processing ranges across a total of 21 levels from "level 0" as the minimum level to "level 20" as the maximum level.

The increase button 661 in the acceptance screen 660 is a button to accept an instruction from the user to increase the acceptance level value displayed in the level display section 662. If the user touches the increase button 661 with a finger, the acceptance level value displayed in the level display section 662 increases. The decrease button 663 in the acceptance screen 660 is a button to accept an instruction from the user to decrease the acceptance level value displayed in the level display section 662. If the user touches the decrease button 663 with a finger, the acceptance level value displayed in the level display section 662 decreases.

The menu button 668 in the acceptance screen 660 is a button to accept an instruction from the user to suspend the acceptance of the acceptance level value of the sharpness processing. If the user touches the menu button 668 with a finger, a menu screen (not shown) to accept various settings about the projector 10 is displayed in place of the acceptance screen 660. The enter button 669 in the acceptance screen 660 is a button to accept an instruction from the user to finalize the acceptance level value of the sharpness processing. If the user touches the enter button 669 with a finger, the sharpness intensity accepting unit 356 finalizes the acceptance value displayed in the level display section 662 as the acceptance level value selected by the user.

Back to explanation of FIG. 1, the super-resolution on-off accepting unit 358 of the main control CPU 350 accepts an instruction to select the intensity of the super-resolution processing including invalidity of the super-resolution processing carried out by the super-resolution processing unit 332, from the user of the projector 10 via the user interface 60. The super-resolution setting unit 359 of the main control CPU 350 sets the super-resolution setting intensity Ds2 of the super-resolution processing carried out by the super-resolution processing unit 332 in accordance with the instruction accepted by the super-resolution on-off accepting unit 358. In this example, if an instruction to select invalidity is accepted by the super-resolution on-off accepting unit 358, the super-resolution setting unit 359 sets the super-resolution setting intensity Ds2 of the super-resolution processing carried out by the super-resolution processing unit 332 to a valid value that is smaller than in the case where an instruction to select the valid intensity is accepted by the super-resolution on-off accepting unit 358. That is, even if invalidity of the super-resolution processing is accepted by the super-resolution on-off accepting unit 358, the super-resolution processing is actually not invalid and the super-resolution processing unit 332 carries out the super-resolution processing with the lower intensity than the intensity in the case of valid super-resolution processing.

Figure 6:
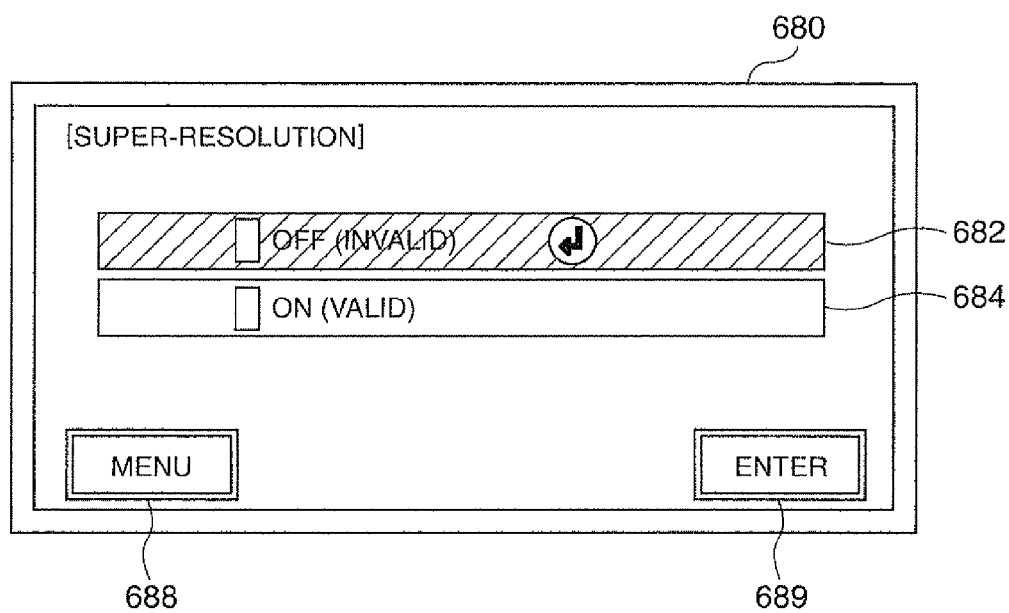
FIG. 6 is an explanatory view showing an acceptance screen to accept an instruction to select the intensity of super-resolution processing including invalidity of super-resolution processing.

FIG. 6 is an explanatory view showing an acceptance screen 680 to accept an instruction to select the intensity of the super-resolution processing including invalidity of the super-resolution processing. In this example, the user interface 60 is a touch panel as described above. The acceptance screen 680 is a screen displayed on the user interface 60 when accepting an instruction to select the intensity of the super-resolution processing including invalidity of the super-resolution processing. The acceptance screen 680 has an invalidity button 682, a validity button 684, a menu button 688, and an enter button 689.

The invalidity button 682 in the acceptance screen 680 is a button to accept invalidity of the super-resolution processing from the user. If the user touches the invalidity button 682 with a finger, the state where invalidity of the super-resolution processing is accepted is indicated by highlighting. The validity button 684 in the acceptance screen 680 is a button to accept validity of the super-resolution processing from the user. If the user touches the validity button 684 with a finger, the state where validity of the super-resolution processing is accepted is indicated by highlighting.

The menu button 688 in the acceptance screen 680 is a button to accept an instruction from the user to suspend the acceptance of validity and invalidity of the super-resolution processing. If the user touches the menu button 688 with a finger, a menu screen (not shown) to accept various settings about the projector 10 is displayed in place of the acceptance screen 680. The enter button 689 in the acceptance screen 680 is a button to accept an instruction from the user to finalize the intensity of the super-resolution processing including invalidity of the super-resolution processing. If the user touches the enter button 689 with a finger, the super-resolution on-off accepting unit 358 finalizes invalidity of the super-resolution processing as the instruction from the user if the invalidity button 682 is highlighted, and finalizes validity of the super-resolution processing as the instruction from the user if the validity button 684 is highlighted. FIG. 6 shows that the invalidity button 682 is highlighted.

Back to the explanation of FIG. 1, the image display unit 40 of the projector 10 displays the image processed by the image processing unit 30. The image display unit 40 has a light source 42, an image projection system 50, and a projection system 48.

The light source 42 of the projector 10 emits light from a light source. The light emitted from the light source 42 is supplied to the image projection system 50. In this example, the light source 42 has a discharge lamp which emits light by arc discharge, as its light source.

The image projection system 50 of the projector 10 generates image projection light that is displayed as a video, from the light supplied from the light source 42. The image projection light generated by the image projection system 50 is sent out to the projection system 48. In this example, the image projection system 50 is a color separation and combining system. The image projection system 50 separates the light supplied from the light source 42 into red light, green light and blue light by using dichroic mirrors 55$a$ and 55$b$, modulates these lights by using three spatial light modulators 58$r$, 58$g$ and 58$b$, then combining these light into a single light by using a dichroic prism 59 and thus generates image projection light. In this example, the number of spatial light modulators is three. However, in other embodiments, the number of spatial light modulators may be three or less, or may be three or more. In this example, the spatial light modulators are transmission-type liquid crystal panels which modulate transmitted light. However, in other embodiments, reflection-type liquid crystal panels which modulate reflected light may be used or micromirror light modulators including digital micromirror devices (DMDs) may be used.

The projection system 48 of the projector 10 projects the projection light generated by the image projection system 50, on the screen 90. In this example, the projection system 48 is a projection lens unit in which plural lenses including a front lens, a zoom lens, a master lens and a focusing lens are arrayed. The projection system 48 is not limited to the projection lens unit and may be an optical system which reflects the projection light generated by the image projection system to the screen 90 by using at least one of an aspherical lens, a magnifying lens, a diffusion glass, an aspherical mirror and a reflection mirror.

A2. Operation of Projector

Figure 7:
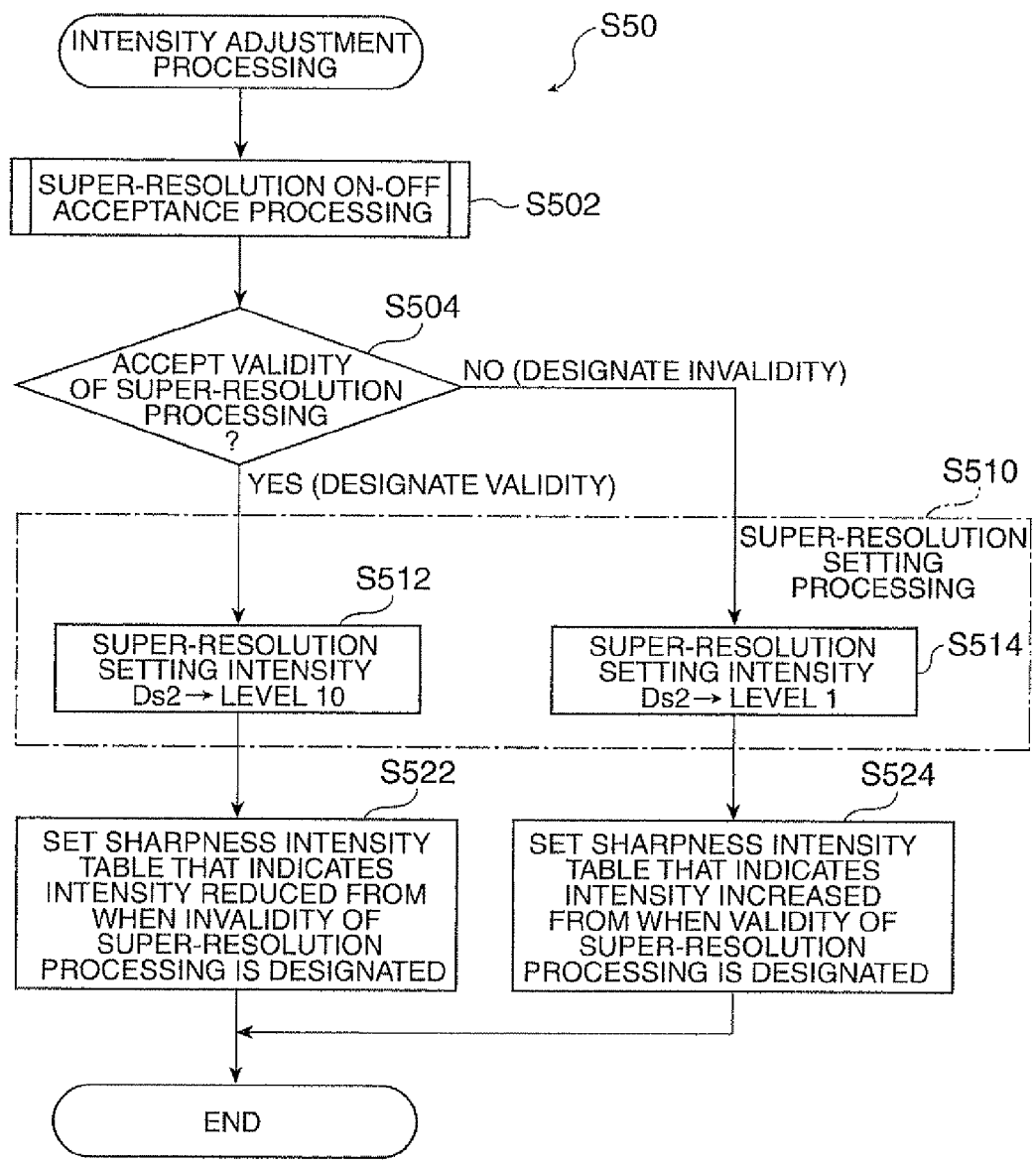
FIG. 7 is a flowchart showing intensity adjustment processing executed by a main control CPU of the projector.

FIG. 7 is a flowchart showing intensity adjustment processing (step S50) executed by the main control CPU 350 of the projector 10. The intensity adjustment processing (step S50) is the processing to adjust the combination of the sharpness processing by the sharpness processing unit 314 and the super-resolution processing by the super-resolution processing unit 332. In this example, if a change in the setting about the super-resolution processing is requested by the user, the main control CPU 350 starts the intensity adjustment processing (step S50).

As the intensity adjustment processing (step S50) is started, the main control CPU 350 of the projector 10 operates as the super-resolution on-off accepting unit 358 and thus executes super-resolution on-off acceptance processing (step S502). In the super-resolution on-off acceptance processing (step S502), the main control CPU 350 accepts an instruction to select the intensity of the super-resolution processing including invalidity of the super-resolution processing from the user via the acceptance screen 680 shown in FIG. 6.

After the super-resolution on-off acceptance processing (step S502), the main control CPU 350 determines whether the instruction accepted in the super-resolution on-off acceptance processing (step S502) is validity or invalidity of the super-resolution processing (step S504), then operates as the super-resolution setting unit 359, and thus executes super-resolution setting processing (step S510). If validity of the super-resolution processing is accepted in the super-resolution on-off acceptance processing (step S502) (YES in step S504), the main control CPU 350 in the super-resolution setting processing (step S510) sets the super-resolution setting intensity Ds2 with a valid value (in this example, the maximum value "10") in the super-resolution processing unit 332 (step S512). Meanwhile, if invalidity of the super-resolution processing is accepted in the super-resolution on-off acceptance processing (step S502) (NO in step S504), the main control CPU 350 in the super-resolution setting processing (step S510) sets the super-resolution setting intensity Ds2 with a smaller valid value than in the case where validity of the super-resolution processing is designated (in this example, a valid value "1", which is not the invalid minimum value "0") in the super-resolution processing unit 332 (step S514).

After the super-resolution setting processing (step S510), the main control CPU 350 sets a sharpness intensity table indicating the sharpness setting intensity Ds1 corresponding to the acceptance level value accepted by the sharpness intensity accepting unit 356, in the sharpness setting unit 357 (step S522, S524). If validity of the super-resolution processing is accepted in the super-resolution on-off acceptance processing (step S502) (YES in step S504), the main control CPU 350 sets a sharpness intensity table indicating the sharpness setting intensity Ds1 that is lower than in the case where invalidity of the super-resolution processing is designated, in the sharpness setting unit 357 (step S522). After setting the sharpness intensity table in the sharpness setting unit 357 (step S522, S524), the main control CPU 350 ends the intensity adjustment processing (step S50).

FIG. 8 is an explanatory view showing an example of the sharpness intensity table set in the sharpness setting unit 357 in the intensity adjustment processing (step S50). The top of FIG. 8 shows a sharpness intensity table 372 that is set in the sharpness setting unit 357 if validity of the super-resolution processing is accepted in the super-resolution on-off acceptance processing (step S502) (YES in step S504). The bottom of FIG. 8 shows a sharpness intensity table 374 that is set in the sharpness setting unit 357 if invalidity of the super-resolution processing is accepted in the super-resolution on-off acceptance processing (step S502) (NO in step S504).

As shown in the top of FIG. 8, in the sharpness intensity table 372 in the case where validity of the super-resolution processing is designated, a total of 21 levels of sharpness setting intensity Ds1 increasing from an intensity value "2" to an intensity value "22" by one unit are associated with the total of 21 levels of acceptance level values from "level 0" to "level 20".

As shown in the bottom of FIG. 8, in the sharpness intensity table 374 in the case where invalidity of the super-resolution processing is designated, a total of 21 levels of sharpness setting intensity Ds1 increasing from an intensity value "5" to an intensity value "25" by one unit, which are greater than in the sharpness intensity table 372, are associated with the total of 21 levels of acceptance level values from "level 0" to "level 20".

For example, if "level 10" is accepted by the sharpness intensity accepting unit 356 as the acceptance level value of the sharpness processing, in the state where validity of the super-resolution processing is designated and the sharpness intensity table 372 is set in the sharpness setting unit 357, the sharpness setting intensity Ds1 with an intensity value "12" is set in the sharpness processing unit 314. Meanwhile, even if "level 10" is accepted by the sharpness intensity accepting unit 356 as the acceptance level value of the sharpness processing, in the state where invalidity of the super-resolution processing is designated and the sharpness intensity table 374 is set in the sharpness setting unit 357, the sharpness setting intensity Ds1 with an intensity value "15" is set in the sharpness processing unit 314.

A3. Effects

In the projector 10 described above, the intensity of the sharpness processing carried out by the sharpness processing unit 314 is reduced in accordance with the increase in the intensity of the super-resolution processing carried out by the super-resolution processing unit 332, and the intensity of the sharpness processing carried out by the sharpness processing unit 314 is increased in accordance with the reduction in the intensity of the super-resolution processing carried out by the super-resolution processing unit 332. Therefore, excessive sharpening of an image due to the implementation of the two kinds of image processing which are similar in terms of sharpening an image, that is, the sharpness processing and the super-resolution processing, can be avoided. Consequently, the quality of an image displayed in an enlarged form by interpolation of pixels can be improved.

If an instruction to select invalidity is accepted by the super-resolution on-off accepting unit 358, the super-resolution setting intensity Ds2 of the super-resolution processing carried out by the super-resolution processing unit 332 is set to a smaller valid value than in the case where an instruction to select valid intensity is selected by the super-resolution on-off accepting unit 358. Therefore, the image quality can be improved by the super-resolution processing while excessive sharpening due to the super-resolution processing can be avoided.

Moreover, since the sharpness processing is carried out prior to the super-resolution processing, a part of a contour part that is blurred before or after the enlargement of an image enlarged by interpolation of pixels is sharpened by the sharpness processing before the super-resolution processing is carried out.

Therefore, the processing speed of the super-resolution processing can be improved.

B. Modifications

B1. First Modification

FIG. 9 is an explanatory view showing an exemplary sharpness intensity table in a first modification. The top of FIG. 9 shows a sharpness intensity table 373 that is set in the sharpness setting unit 357 if validity of the super-resolution processing is accepted in the super-resolution on-off acceptance processing (step S502) (YES in step S504), instead of the sharpness intensity table 372. The sharpness intensity table 374 shown in the bottom of FIG. 9 is similar to the sharpness intensity table 374 shown in the bottom of FIG. 8 in the foregoing example.

In the sharpness intensity table 373 in the first modification, the sharpness setting intensity Ds1 lower than in the sharpness intensity table 374 is associated within a variance range corresponding to the acceptance level value accepted by the sharpness intensity accepting unit 356, in which the greater the acceptance level value is, the smaller the variance range is. In this example, in the sharpness intensity table 373 in the first modification, the sharpness setting intensity Ds1 lower than in the sharpness intensity table 372 is associated with each of the total of 21 levels of acceptance level values from "level 0" to "level 20". With the acceptance level values from "level 0" to "level 17", the sharpness setting intensities Ds1 from an intensity value "2" to an intensity value "19" are associated, which are lower by three units than in the sharpness intensity table 372. With the acceptance level value of "level 18", the sharpness setting intensity Ds1 of an intensity value "21" is associated, which is lower by two units than in the sharpness intensity table 372. With the acceptance level value of "level 19", the sharpness setting intensity Ds1 of an intensity value "23" is associated, which is lower by one unit than in the sharpness intensity table 372. With the acceptance level value of "level 20", the sharpness setting intensity Ds1 of an intensity value "25" is associated, which is the same as in the sharpness intensity table 372.

In the projector 10 in the first modification, as in the foregoing example, excessive sharpening of an image due to the implementation of the two kinds of image processing which are similar in terms of sharpening an image, that is, the sharpness processing and the super-resolution processing, can be avoided. Moreover, the sharpening effect can be enhanced in accordance with a request for intenser sharpening.

B2. Second Modification

Figure 10:
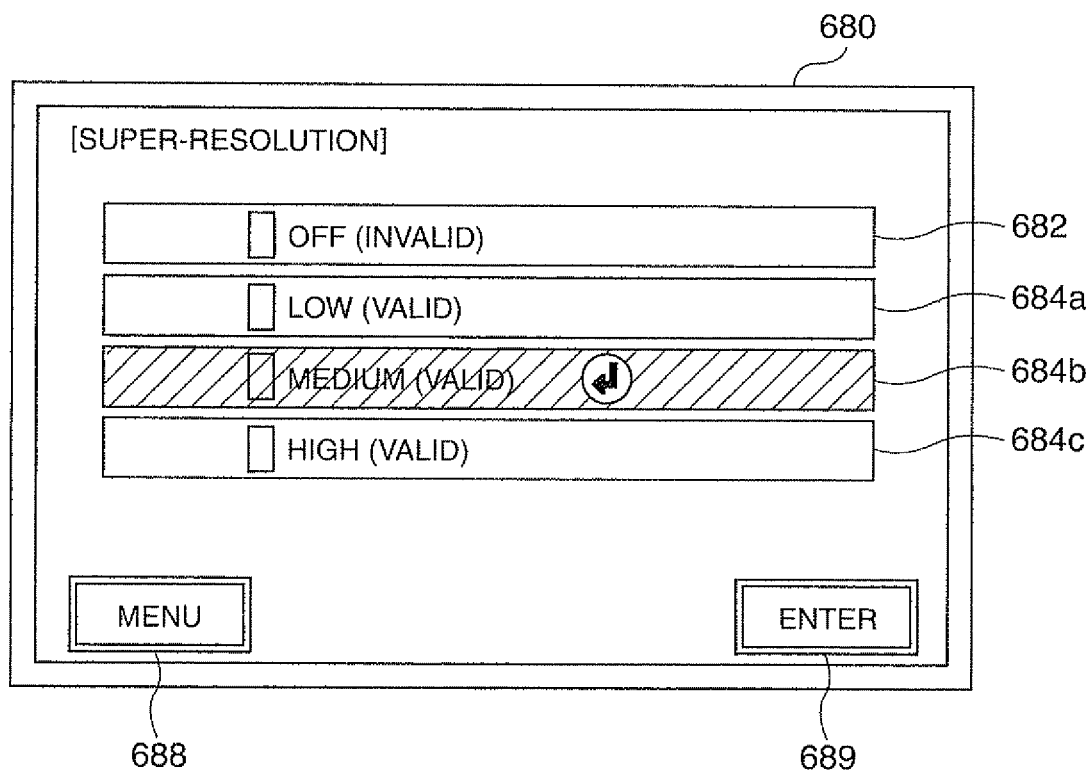
FIG. 10 is an explanatory view showing an acceptance screen to accept an instruction to select the intensity of super-resolution processing including invalidity of super-resolution processing.

FIG. 10 is an explanatory view showing an acceptance screen 680 to accept an instruction to select the intensity of the super-resolution processing including invalidity of the super-resolution processing in a second modification. The acceptance screen 680 in the second modification is similar to the acceptance screen in the foregoing example except for having plural validity buttons 684a, 684b and 684c to accept validity of the super-resolution processing from the user. FIG. 10 shows that the validity button 684b is highlighted.

The validity button 684a is a button to set the super-resolution setting intensity Ds2 of a greater value than by the invalidity button 682. The validity button 684b is a button to set the super-resolution setting intensity Ds2 of a greater value than by the validity button 684a. The validity button 684c is a button to set the super-resolution setting intensity Ds2 of a greater value than by the validity button 684b. For example, in the second modification, the main control CPU 350 sets the super-resolution setting intensities Ds2 of an intensity value "1" for the invalidity button 682, an intensity value "4" for the validity button 684a, an intensity value "7" for the validity button 684b, and a intensity value "10" for the validity button 684c, in the super-resolution processing unit 332. In this example, the acceptance screen 680 accepts validity of the super-resolution processing with three levels of intensity. However, in other embodiments, validity of the super-resolution processing may be accepted with two levels of intensity. Alternatively, validity of the super-resolution processing may be accepted with three or more levels of intensity.

In the second modification, the sharpness setting intensity Ds1 in the case where the super-resolution setting intensity Ds2 has an intensity value "4" is reduced by an intensity value "1", compared with the case where the super-resolution setting intensity Ds2 has an intensity value The sharpness setting intensity Ds1 in the case where the super-resolution setting intensity Ds2 has an intensity value is reduced by an intensity value "2", compared with the case where the super-resolution setting intensity Ds2 has an intensity value "1". The sharpness setting intensity Ds1 in the case where the super-resolution setting intensity Ds2 has an intensity value "10" is reduced by an intensity value compared with the case where the super-resolution setting intensity Ds2 has an intensity value "1".

In the projector 10 in the second modification, as in the foregoing example, excessive sharpening of an image due to the implementation of the two kinds of image processing which are similar in terms of sharpening an image, that is, the sharpness processing and the super-resolution processing, can be avoided. Moreover, the intensity of the super-resolution processing and the intensity of the sharpness processing can be set specifically.

C. Other Embodiments

The embodiment of the invention is described above. However, the invention is not limited to the above embodiment and can be carried out in various forms without departing from the scope of the invention. For example, the form of embodiment of the invention is not limited to a projector and may be in the form of other image display apparatuses such as a liquid crystal display and a plasma display.

In the above example, the sharpness processing by the sharpness processing unit 314 is carried out before the super-resolution processing by the super-resolution processing unit 332. However, in other embodiments, the sharpness processing by the sharpness processing unit 314 may be carried out after the super-resolution processing by the processing super-resolution processing unit 332. In such a case, the main control CPU 350 may operate as the sharpness processing unit 314.

In the above example, the super-resolution processing unit 332 detects a site where the image is blurred before or after enlargement on the basis of the color mixture state of pixels, and reconfigures the image at the detected site with the original colors of the image before the enlargement. However, in other embodiments, the super-resolution processing may be realized by detecting the difference between a reduced image obtained as a result of reducing an enlarged image after the enlargement to the pre-enlargement size and an input image before the enlargement and then repeatedly correcting the enlarged image so that the enlarged image is reduced by that difference.

In the above example, even if an instruction to select invalidity of the super-resolution processing is accepted, the intensity of the super-resolution processing carried out by the super-resolution processing unit 332 is provided with a valid value. However, in other embodiments, the intensity of the super-resolution processing carried out by the super-resolution processing unit 332 may be set to an invalid value (intensity value "0") if an instruction to select invalidity of the super-resolution processing is accepted.

What is claimed is:

1. An image display apparatus which displays an image, the apparatus comprising:

an image input unit which accepts an input of an image used for display;

an image processing unit which carries out image processing on the image accepted by the image input unit, the image processing including (i) sharpness processing to uniformly sharpen an entire image area and (ii) super-resolution processing to selectively sharpen the image enlarged by interpolation of pixels;

an image display unit which displays the image processed by the image processing unit; and a sharpness setting unit which reduces an intensity of the sharpness processing in accordance with an increase in an intensity of the super-resolution processing and increases the intensity of the sharpness processing in accordance with a reduction in the intensity of the super-resolution processing.

2. The image display apparatus according to claim 1, further comprising:

a super-resolution on-off accepting unit which accepts an instruction to select the intensity of the super-resolution processing including invalidity of the super-resolution processing; and a super-resolution setting unit which sets the intensity of the super-resolution processing carried out by the image processing unit to a valid value that is smaller than in the case where an instruction to select valid intensity is accepted by the super-resolution on-off accepting unit, if an instruction to select invalidity is accepted by the super-resolution on-off accepting unit.

3. The image display apparatus according to claim 1, further comprising a sharpness intensity accepting unit which accepts an instruction from a user to select one of plural level values representing the intensity of the sharpness processing, wherein the sharpness setting unit reduces the intensity of the sharpness processing in accordance with an increase in the intensity of the super-resolution processing and increases the intensity of the sharpness processing in accordance with a reduction in the intensity of the super-resolution processing, within a variance range corresponding to the level value accepted by the sharpness intensity accepting unit, and the variance range corresponding to the level value is smaller as the level value becomes greater.

4. The image display apparatus according to claim 1, wherein the image processing unit carries out the sharpness processing prior to the super-resolution processing on the image accepted by the image input unit.

5. An image display method for displaying an image, the method comprising the steps of:

accepting an input of an image;

carrying out image processing on the accepted image, the image processing including (i) sharpness processing to uniformly sharpen an entire image area and (ii) super-resolution processing to selectively sharpen the image enlarged by interpolation of pixels;

displaying the processed image by an image display apparatus which displays an image; and reducing an intensity of the sharpness processing in accordance with an increase in an intensity of the super-resolution processing and increasing the intensity of the sharpness processing in accordance with a reduction in the intensity of the super-resolution processing.

6. The image display method according to claim 5, further comprising:

accepting an instruction to select the intensity of the super-resolution processing including invalidity of the super-resolution processing; and setting the intensity of the super-resolution processing carried out in the image processing to a valid value that is smaller than in the case where an instruction to select valid intensity is accepted, if an instruction to select invalidity is accepted.

7. The image display method according to claim 5, further comprising accepting an instruction to select one of plural level values representing the intensity of the sharpness processing, wherein the intensity of the sharpness processing is reduced in accordance with an increase in the intensity of the super-resolution processing and the intensity of the sharpness processing is increased in accordance with a reduction in the intensity of the super-resolution processing, within a variance range corresponding to the accepted level value, and the variance range corresponding to the level value is smaller as the level value becomes greater.

8. The image display method according to claim 5, wherein the sharpness processing is carried out on the accepted image prior to the super-resolution processing.

9. The image display apparatus according to claim 1, wherein the image processing unit carries out the super-resolution processing to selectively sharpen a portion of the image enlarged by the interpolation of pixels.

10. The image display method according to claim 5, wherein the super-resolution processing selectively sharpens a portion of the image enlarged by the interpretation of pixels.

* * * * *